(12) United States Patent
Twilla (10) Patent No.: US 11,534,032 B1
(45) Date of Patent: Dec. 27, 2022

(54) VERTICAL HANGING POT RACK

(71) Applicant: Neil Twilla, Auburntown, TN (US)

(72) Inventor: Neil Twilla, Auburntown, TN (US)

( * ) Notice: Subject to any disclaimer, the term of this patent is extended or adjusted under 35 U.S.C. 154(b) by 0 days.

(21) Appl. No.: 17/714,729

(22) Filed: Apr. 6, 2022

(51) Int. Cl.
  *A47J 47/20* (2019.01)
  *A47J 47/16* (2006.01)
  *A47J 47/10* (2006.01)

(52) U.S. Cl.
  CPC .............. *A47J 47/16* (2013.01); *A47J 47/10* (2013.01)

(58) Field of Classification Search
  CPC .. A47J 47/16; A47J 47/00; A47J 47/10; A47J 47/20
  USPC .......... 248/176.1, 300, 301, 302, 303, 309.1
  See application file for complete search history.

(56) References Cited

U.S. PATENT DOCUMENTS

| | | | | | |
|---|---|---|---|---|---|
| 283,418 | A | * | 8/1883 | Ries | A47G 25/005 211/35 |
| 360,577 | A | * | 4/1887 | Fisher | A47F 5/01 211/32 |
| 549,505 | A | * | 11/1895 | Eldridge | A47G 1/16 248/489 |
| 718,085 | A | * | 1/1903 | Brott | E04D 13/0722 248/48.1 |
| 763,449 | A | * | 6/1904 | Wolford | E04D 13/0722 248/48.1 |
| 854,077 | A | * | 5/1907 | Cronholm | B65B 67/1227 248/100 |
| 866,270 | A | * | 9/1907 | Fleming | A47G 1/1646 248/490 |
| 1,020,791 | A | * | 3/1912 | Baldwin | A47G 25/10 248/303 |
| 1,309,608 | A | * | 7/1919 | Bonner | A47J 47/16 211/41.11 |
| 1,331,680 | A | * | 2/1920 | Sherwood | A47G 7/047 76/DIG. 8 |
| 1,477,702 | A | * | 12/1923 | Hall | A47C 7/64 248/302 |

(Continued)

OTHER PUBLICATIONS

Etsy; "Set of Six Wrought Iron Double Ended Hooks-Rustic Kitchen Hook, Rustic Pot Rack, Pot Rack Hook, Pot Rack Accessories, Utensil Hooks, S hooks"; https://www.etsy.com/listing/549604088/set-of-six-wrought-iron-double-ended.

*Primary Examiner* — Nkeisha Smith
(74) *Attorney, Agent, or Firm* — Hollowell Patent Group; Kelly Hollowell (57) ABSTRACT

An exemplary storage rack comprising a storage rack structure section having a rack support, said support comprising an elongated member with a hanging end and a connecting end distal from the hanging end, wherein the hanging end and the connecting end comprise respective connector apertures, an accessory support comprising an elongated member disposed substantially perpendicular to the rack support, wherein the accessory support is substantially bisected by the rack support, and wherein the rack support and the accessory support are formed from a single strand of a thread-like structure. The storage rack may comprise a plurality of sections interconnected by connector apertures at a connecting end of one section and a hanging end of another section. The thread-like structure may be wire and connector apertures may comprise a perimeter twist advantageously permitting individual sections of an interconnected plurality of storage rack structure sections to swivel while supporting a heavy load.

20 Claims, 7 Drawing Sheets

(56) References Cited

U.S. PATENT DOCUMENTS

| | | | | |
|---|---|---|---|---|
| 1,528,744 A * | 3/1925 | Dix | A47J 47/16 | 211/50 |
| 1,557,506 A * | 10/1925 | Walthers | A01G 5/02 | 248/302 |
| 1,619,434 A * | 3/1927 | Reese | A47F 7/148 | 40/124 |
| 1,813,932 A * | 7/1931 | Kennard | A47G 25/743 | 211/119 |
| 1,842,118 A * | 1/1932 | Resnik | A47J 47/16 | 211/106 |
| 2,221,659 A * | 11/1940 | Wilkie | A47F 7/148 | D6/678.4 |
| 2,456,535 A * | 12/1948 | Rundell | A47J 47/16 | 248/302 |
| 2,553,764 A * | 5/1951 | Hawkins | A47J 47/16 | 211/74 |
| 2,797,030 A | 6/1957 | Hillhuff | | |
| 3,867,788 A * | 2/1975 | Mickelson | A47G 7/047 | 248/318 |
| 3,923,279 A * | 12/1975 | Gresley | A61M 5/1415 | 248/318 |
| 3,999,821 A * | 12/1976 | Moody | A47F 5/0006 | 62/62 |
| 4,037,737 A * | 7/1977 | Stevens | A47J 47/16 | 248/303 |
| 4,429,797 A * | 2/1984 | Collins | A47G 25/743 | 211/119 |
| 6,257,421 B1 * | 7/2001 | Outten | A47F 7/148 | 248/303 |
| 6,997,329 B2 * | 2/2006 | Ohanian | A47J 47/16 | 211/181.1 |
| 8,083,079 B2 * | 12/2011 | Rosen | D06F 79/02 | 248/302 |
| 8,122,675 B2 * | 2/2012 | Ripley | E04C 5/168 | 248/302 |
| 10,779,632 B2 * | 9/2020 | Roberts | A41G 5/0086 | |
| 10,905,279 B2 * | 2/2021 | Groll | A47J 47/16 | |
| 2006/0261021 A1 * | 11/2006 | Stagnaro | A47J 47/16 | 211/119 |
| 2011/0253759 A1 * | 10/2011 | Scalese | A45F 5/02 | 224/660 |
| 2012/0199714 A1 | 8/2012 | Rinaldo | | |
| 2015/0129730 A1 * | 5/2015 | Gold | A47F 5/0815 | 248/302 |

* cited by examiner

VERTICAL HANGING POT RACK

TECHNICAL FIELD

This disclosure relates generally to storage racks.

BACKGROUND

Storage racks are structures configured to retain physical items. Some storage racks may retain horizontally arranged items. For example, such a storage rack may include shelves to support stored items. Some storage racks may retain vertically arranged items. Such a storage rack may include hooks to support stored items. Physical items retained by a storage rack may include various types of items such as, for example, appliances, clothing, pots and pans, sports equipment, tools, and the like. Physical items retained by a storage rack may vary in size and weight. For example, some items such as pots and pans or tools may be very heavy. Some storage racks may be unable to provide convenient access to many heavy items. Storing a great number of items may require a large storage rack wasting much space. A user desiring to store many pots and pans may have to expend significant effort inconveniently rearranging pots and pans for access or using multiple storage racks to support the heavy load.

SUMMARY

An exemplary storage rack comprising a storage rack structure section having a rack support, said support comprising an elongated member with a hanging end and a connecting end distal from the hanging end, wherein the hanging end and the connecting end comprises respective connector apertures, an accessory support comprising an elongated member disposed substantially perpendicular to the rack support, wherein the accessory support is substantially bisected by the rack support, and wherein the rack support and the accessory support are formed from a single strand of a thread-like structure. The storage rack may comprise a plurality of sections interconnected by connector apertures at a connecting end of one section and a hanging end of another section. The thread-like structure may be wire and connector apertures may comprise a perimeter twist advantageously permitting individual sections of an interconnected plurality of storage rack structure sections to swivel while supporting a heavy load.

Various implementations may achieve one or more technical effect. For example, some implementations may improve a user's ease of access to stored pots or pans. This facilitation may be a result of a vertical pot storage rack designed to reduce the user's effort adjusting the rack and rearranging the user's pots and pans in the rack. In some implementations, the storage capacity of a rack may be easily and economically adapted to adjust the rack to the number and weight of the user's items. Such economical rack storage capacity adjustment may be a result of a modular storage rack design permitting sections to be added or removed as the number or weight of items needing storage changes.

Some implementations may improve a user's efficiency by reducing wasted time and effort searching for a particular item. Such improved efficiency may be a result of a vertical storage rack design that can be configured from multiple sections, providing individual access to all items stored, while permitting individual sections to swivel for easy access.

Some implementations may reduce the cost of rack storage. This facilitation may be a result of an expandable storage rack design based on an individual rack section configured from a single strand of a thread-like structure, such as wire or cable. For example, a storage rack configured from a single continuous strand of wire may cost less than a storage rack designed with multiple different parts, and cost may be reduced by an expandable design permitting a user to acquire only the needed number of sections at a given time. Some designs may reduce required storage space for a given collection of items. Such a reduction in required storage space for a given collection of items may be a result of a storage rack designed to support items in a vertical hanging rack, reducing the floor space required to store the collection.

In an illustrative example, some implementations may be able to support heavier loads. A storage rack implementation designed to accommodate heavier loads may have industrial applicability to suspend heavy industrial tools or equipment for easily accessible storage. Such increased load capacity may be a result of a storage rack designed with rack sections configured from wire or cable. Various implementations may be made at reduced cost. Such reduced cost to make a storage rack may be a result of a simplified manufacturing process based on forming a low-cost single strand of a thread-like structure into a storage rack section.

The details of various aspects are set forth in the accompanying drawings and the description below. Other features and advantages will be apparent from the description and drawings, and from the claims. Like reference symbols in the various drawings indicate like elements.

DETAILED DESCRIPTION

To aid understanding, this detailed description is organized as follows. First, a hierarchical general description distinct from the description of the drawings is presented. Second, exemplary design of a modular storage rack section is introduced with reference to FIG. 1. Third, with reference to FIG. 2, the discussion turns to exemplary storage rack implementations that illustrate multiple interconnected storage rack sections. Then, with reference to FIGS. 3A-3B and 4, exemplary storage rack implementation features designed to enhance expandability and usability are disclosed. Specifically, a method to interconnect multiple rack sections for expandability and a connector aperture perimeter twist permitting individual storage rack sections to swivel while supporting heavy loads are disclosed. Finally, with reference to FIGS. 5-7, various storage rack implementations configured using multiple interconnected individual storage rack sections supporting stored items are presented to explain improvements in storage rack technology.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features. In particular, it is noted that the respective implementation features, even those disclosed solely in combination with other implementation features, may be combined in any configuration excepting those readily apparent to the person skilled in the art as nonsensical.

The present disclosure teaches an apparatus. The apparatus may comprise a storage rack. The storage rack may be a pot storage rack. The pot storage rack may be a vertical pot storage rack. The apparatus may comprise at least one storage rack structure section. The apparatus may comprise a plurality of interconnected storage rack structure sections. A storage rack structure section may comprise a rack support. The rack support may comprise a hanging end. The rack support hanging end may comprise a connector aperture. The rack support may comprise a connecting end. The rack support connecting end may comprise a connector aperture. Any of the connector apertures may be configured with an eye-loop to permit interconnecting multiple storage rack structure sections. Any of the connector apertures may comprise a loop, rectangle, triangle, ellipse, or the like. A storage rack structure section may further comprise an accessory support. The accessory support may be disposed substantially perpendicular to the rack support. The accessory support may be substantially bisected by the rack support.

The storage rack structure section comprising the rack support and the accessory support may be formed from a single strand of a thread-like structure. The thread-like structure may be wire. The thread-like structure may be mild steel. Mild steel may be low-carbon steel. For some storage rack designs, the thread-like structure may comprise mild steel having a carbon content in a range of 0 to 0.30%. For storage rack designs needing to support heavier loads, the thread-like structure may comprise mild steel having a carbon content in a range of 0.30 to 2.1%. The thread-like structure may comprise cable. The thread-like structure may comprise plastic. The accessory support may be configured with a plurality of notches designed to support items. Items supported may include pots, pans, tools, or the like.

The accessory support may be configured with a first plurality of notches disposed at one side of the rack support and a second plurality of notches disposed at the other side of the rack support. The connector aperture perimeter may be configured with a twist designed to permit an individual storage rack section to swivel about an axis substantially parallel with at least one rack support while supporting a heavy load. The storage rack may be secured to a ceiling or other elevated mounting point using a fastener. The storage rack may be secured to a floor using a fastener. The fastener may comprise a chain, rope, wire, suction cup, or other fastener.

Figure 1:
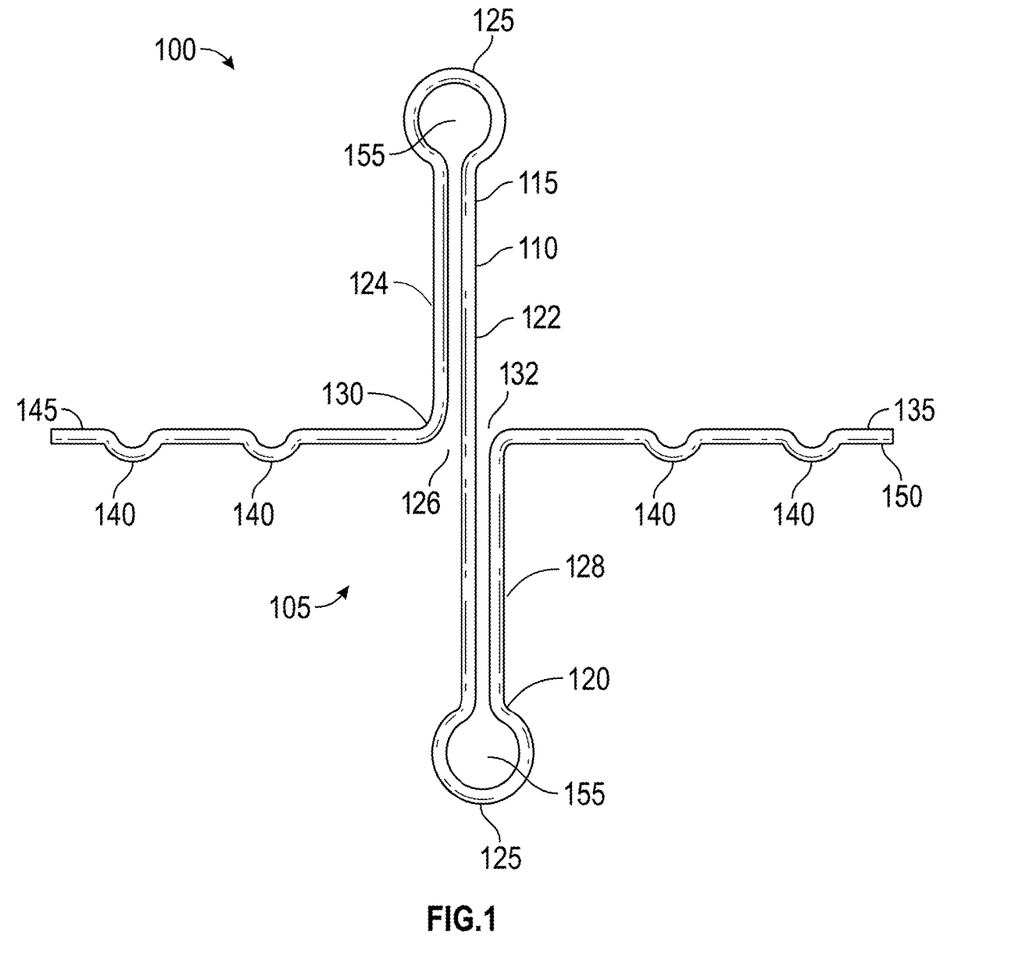
FIG. 1 depicts a side view of a modular storage rack section comprising a single strand of wire forming an accessory support substantially perpendicular to a rack support configured with connector apertures designed for interconnecting multiple storage rack sections.

FIG. 1 depicts a side view of a modular storage rack section comprising a single strand of wire forming an accessory support substantially perpendicular to a rack support configured with connector apertures designed for interconnecting multiple storage rack sections. In FIG. 1, the apparatus 100 is a storage rack. The depicted storage rack includes the storage rack structure section 105. In the depicted implementation the storage rack structure section 105 comprises the rack support 110. In the depicted implementation the rack support 110 is configured with the hanging end 115 and the connecting end 120. In the depicted implementation the rack support 110 comprises the rack support central section 122. In the depicted implementation the rack support central section 122 extends from the rack support 110 hanging end 115 to the rack support 110 connecting end 120.

In the illustrated implementation the rack support central section 122 and the first rack support side section 124 define the hanging end channel 126. In the depicted implementation the hanging end channel 126 is open toward the rack support 110 connecting end 120. In the illustrated implementation the rack support 110 hanging end 115 and the rack support 110 connecting end 120 are configured with respective connector apertures 125. In the depicted implementation the storage rack structure section 105 further comprises the accessory support 130 disposed substantially perpendicular to the rack support 110. In the illustrated implementation the accessory support 130 is substantially bisected by the rack support 110. In the illustrated implementation the rack support central section 122 and the second rack support side section 128 define the connecting end channel 132. In the depicted implementation the connecting end channel 132 is open toward the rack support 110 hanging end 115. In the illustrated implementation the rack support 110 hanging end 115 and the rack support 110 connecting end 120 are configured with respective connector apertures 125. In the depicted implementation the storage rack structure section 105 further comprises the accessory support 130 disposed substantially perpendicular to the rack support 110. In the illustrated implementation the accessory support 130 is substantially bisected by the rack support 110.

In the depicted implementation the rack support 110 and the accessory support 130 are formed from a single strand of a thread-like structure 135. In the depicted implementation the thread-like structure 135 comprises wire. The wire may comprise mild steel. The mild steel may be low carbon steel. The thread-like structure 135 may comprise cable or plastic. In the depicted implementation the accessory support 130 is configured with a plurality of notches 140 designed to support items. The items may hang from the accessory support 130. In the depicted implementation the accessory support 130 is configured with a first plurality of notches 140 at one side of the rack support 110 and a second plurality of notches 140 at the other side of the rack support 110 to support a plurality of hanging items such as pots from each side of the rack support 110. In the depicted example the storage rack structure section 105 is formed from the single strand of the thread-like structure 135 that extends continuously from the beginning accessory support end 145 to the ending accessory support end 150.

Figure 3A:
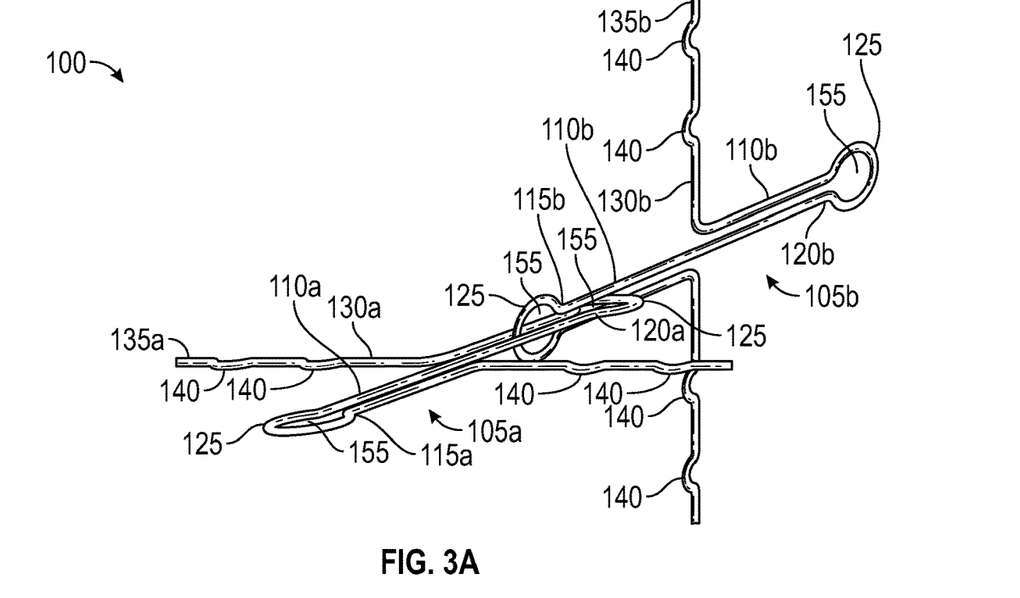
FIG. 3A depicts a perspective view of a portion of an exemplary method to interconnect multiple storage rack sections based on inserting one end of a storage rack section wire through a connector aperture of another storage rack section.

In the depicted implementation the rack support 110 hanging end 115 connector aperture 125 and the rack support 110 connecting end 120 connector aperture 125 are configured with the depicted eye-loop 155 designed to permit interconnecting multiple storage rack sections 105 based on inserting one end of a storage rack section 105 thread-like structure 135 through a connector aperture 125 of another storage rack section 105, depicted for example by FIG. 3A. The depicted eye-loops 155 are closed eye-loops.

Figure 2:
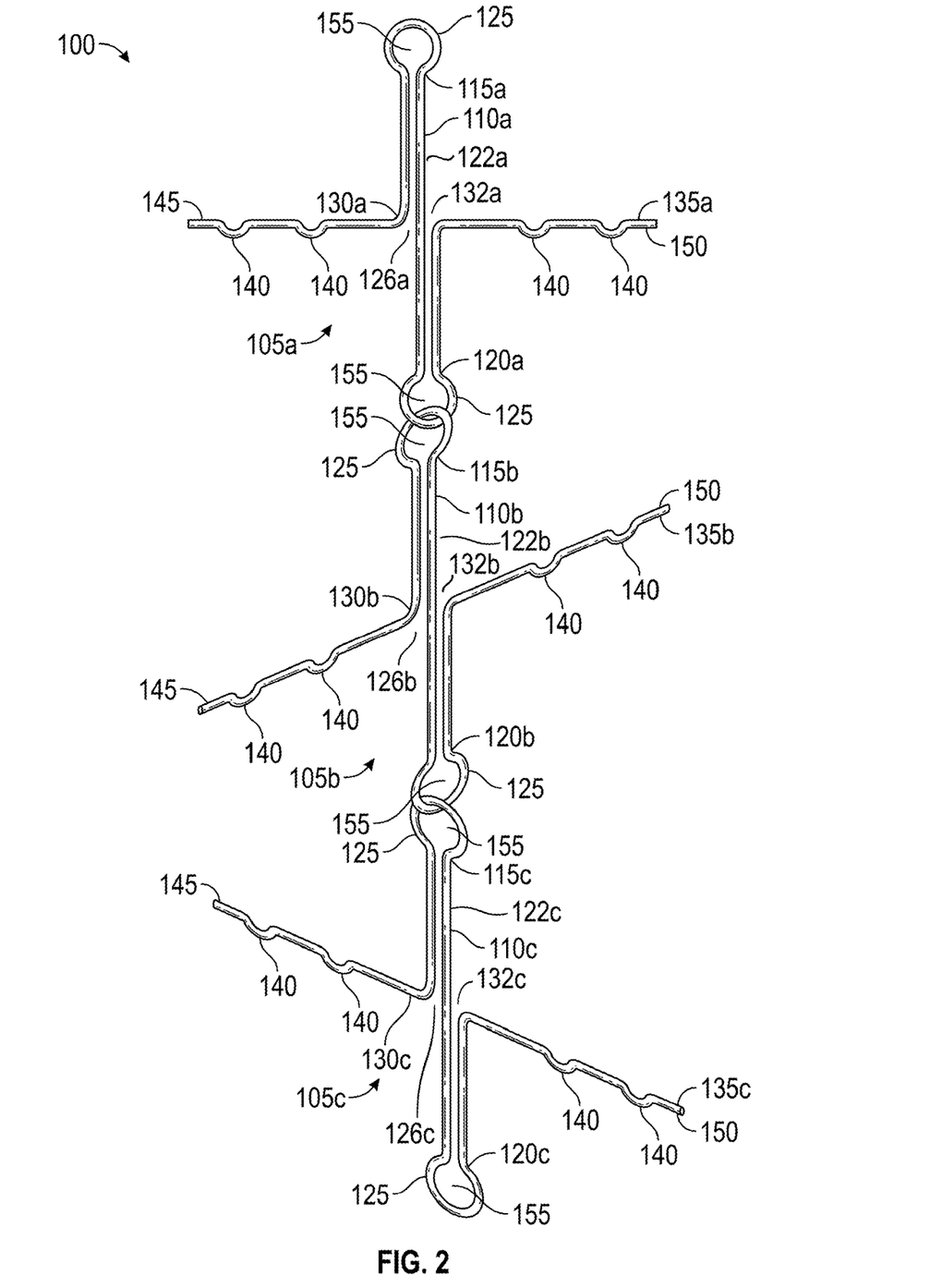
FIG. 2 depicts a side view of three modular storage rack sections interconnected in a vertical storage rack configuration.

FIG. 2 depicts a side view of three modular storage rack sections interconnected in a vertical storage rack configuration. In FIG. 2, the depicted storage rack sections 105a, 105b, and 105c comprise at least the storage rack 105 features described with reference to FIG. 1. The depicted storage rack sections 105a, 105b, and 105c are interconnected by their respective connector apertures 125. In the depicted implementation the storage rack section 105a rack support 110a connecting end 120a is interconnected with the storage rack section 105b rack support 110b hanging end 115b and the storage rack section 105b connecting end 120b is interconnected with the storage rack section 105c rack support 110c hanging end 115c. In the illustrated implementation the depicted storage rack sections 105a, 105b, and 105c include their respective rack support central sections 122a, 122b, and 122c, hanging end channels 126a, 126b, and 126c, and connecting end channels 132a, 132b, and 132c, described with reference to FIG. 1. The depicted storage rack sections 105a, 105b, and 105c are each formed from a single strand of a respective thread-like structure 135a, 135b, and 135c. In the depicted implementation, the depicted storage rack sections 105a, 105b, and 105c include respective accessory supports 130a, 130b, and 130c configured with notches 140 to support hanging items.

FIG. 3A depicts a perspective view of a portion of an exemplary method to interconnect multiple storage rack sections based on inserting one end of a storage rack section wire through a connector aperture of another storage rack section. In FIG. 3A, the storage rack sections 105a and 105b comprise at least the storage rack 105 features described with reference to FIG. 1. In the depicted implementation the storage rack sections 105a and 105b are depicted in an illustrative phase of an exemplary process to interconnect the storage rack sections 105a and 105b. In the depicted implementation a user is inserting the single strand of the thread-like structure 135a of storage rack section 105a into the storage rack section 105b to form a storage rack comprising multiple storage rack sections 105a and 105b. After inserting the thread-like structure 135a of storage rack section 105a into the storage rack section 105b as depicted, the user may pull the thread-like structure 135a of storage rack section 105a into the rack support 110b hanging end 115b connector aperture 125 to interconnect the storage rack sections 105a and 105b.

Figure 3B:
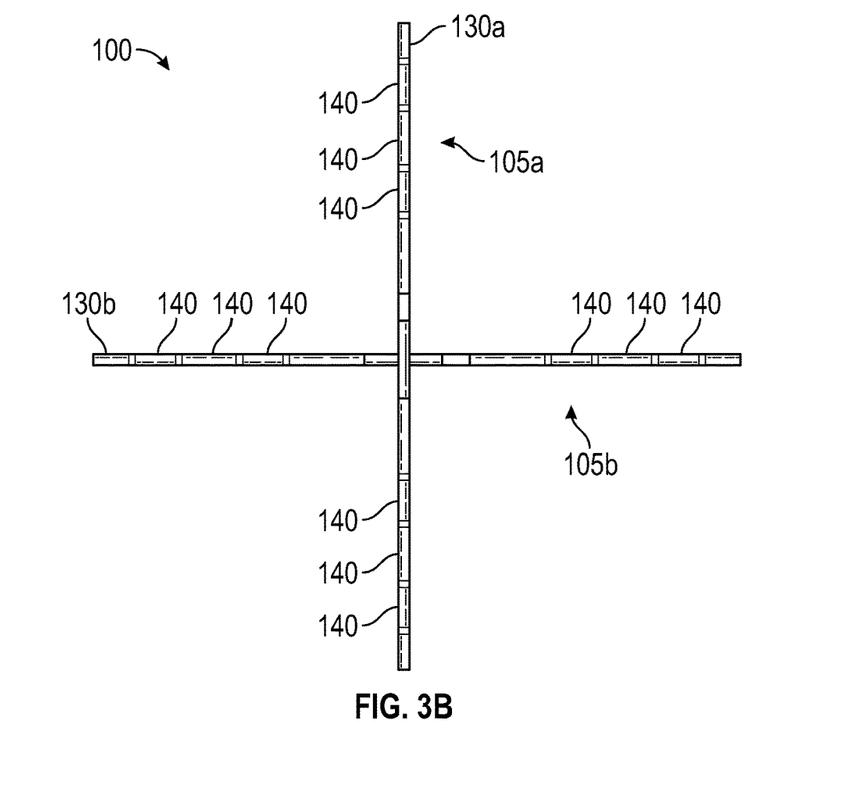
FIG. 3B depicts a top view of two storage rack sections interconnected in a vertical storage rack configuration.

FIG. 3B depicts a top view of two storage rack sections interconnected in a vertical storage rack configuration. In FIG. 3B, the storage rack sections 105a and 105b comprise at least the storage rack 105 features described with reference to FIG. 1. In the depicted implementation the storage rack section 105a is disposed elevated above the storage rack section 105b.

Figure 4:
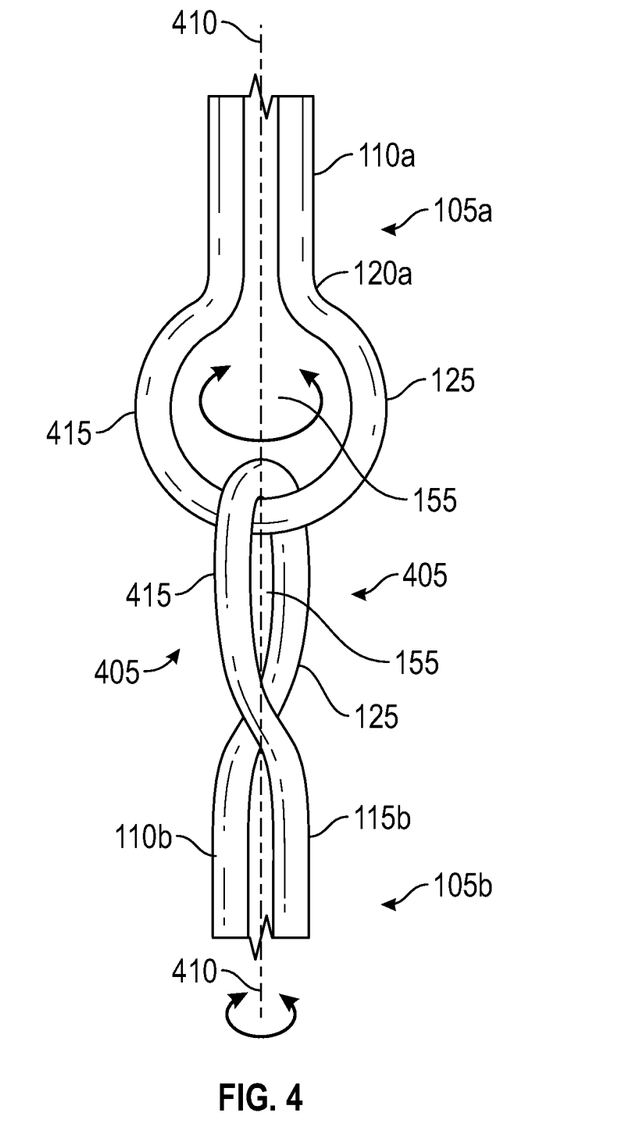
FIG. 4 depicts a detail view of two storage rack sections interconnected by respective connector apertures wherein the lower connector aperture presents a side view of an exemplary twist feature configured to permit the rack sections to swivel while supporting heavier loads for convenient user access.

FIG. 4 depicts a detail view of two storage rack sections interconnected by respective connector apertures wherein the lower connector aperture presents a side view of an exemplary twist feature configured to permit the rack sections to swivel while supporting heavier loads for convenient user access. In FIG. 4, the storage rack sections 105a and 105b comprise at least the storage rack 105 features described with reference to FIG. 1. In the depicted implementation the interconnected storage rack section 105a and storage rack section 105b include the exemplary connector aperture twist 405 designed to permit the storage rack section 105a and storage rack section 105b to swivel about the axis 410 substantially parallel with at least one rack support. In the depicted implementation the connector aperture twist 405 is configured in the connector aperture perimeter 415. In an illustrative example, configuring at least one or both of the storage rack sections 105a or the storage rack section 105b with the connector aperture twist 405 feature may permit an individual storage rack section 105 to swivel more easily and improve a user's ease of access to hanging items, while supporting heavier loads.

Figure 5:
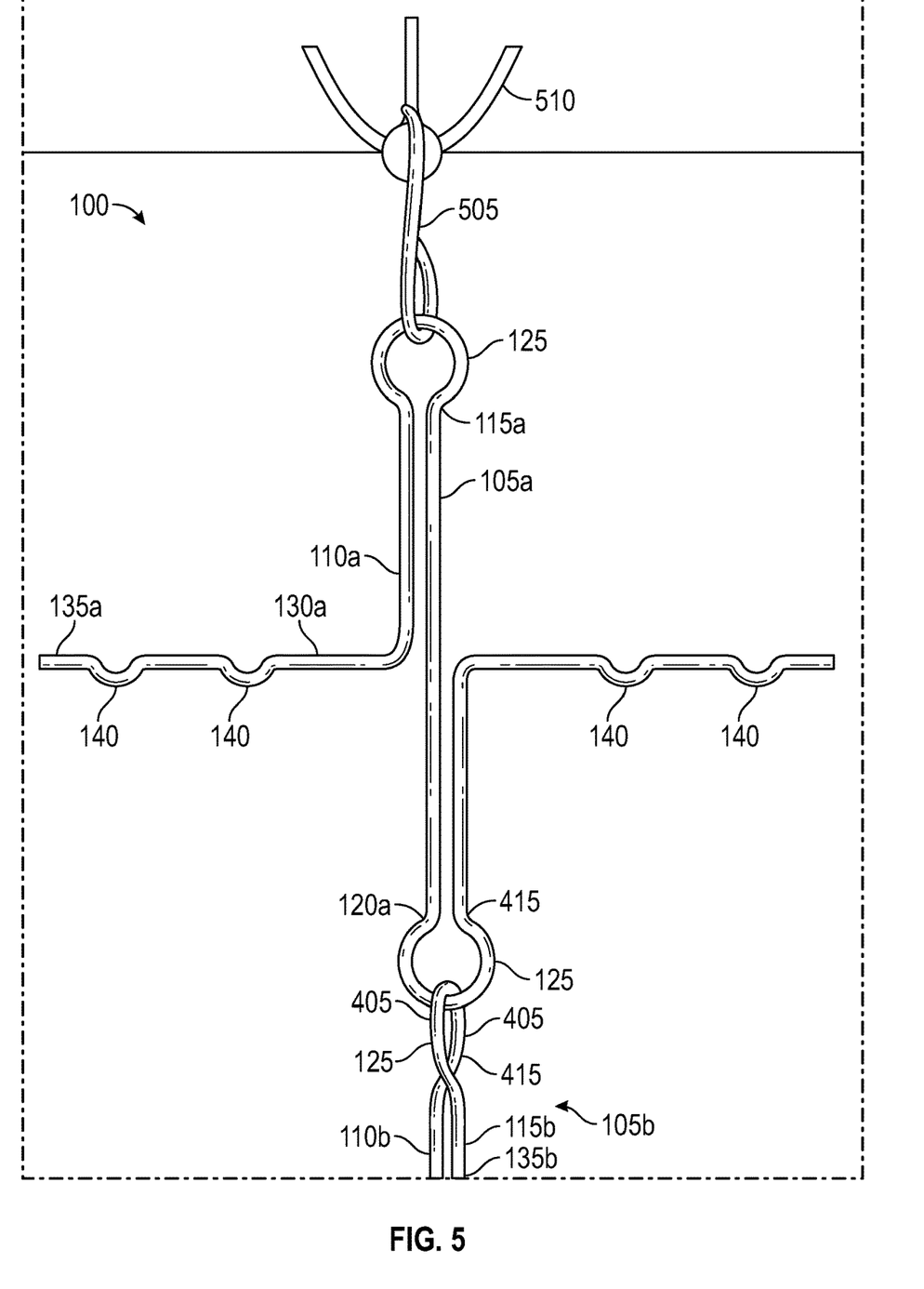
FIG. 5 depicts two interconnected storage rack sections wherein the upper rack section is secured to a ceiling mount.

FIG. 5 depicts two interconnected storage rack sections wherein the upper rack section is secured to a ceiling mount. In FIG. 5, the interconnected storage rack sections 105a and 105b comprise at least the storage rack 105 features described with reference to FIG. 1. In the depicted implementation the storage rack section 105a is supported by the fastener 505 connected to the ceiling 510, and the storage rack section 105b is supported by the storage rack section 105a. In the depicted implementation the fastener 505 is a length of rope. The fastener 505 may be, for example, a length of wire, string, or chain.

Figure 6:
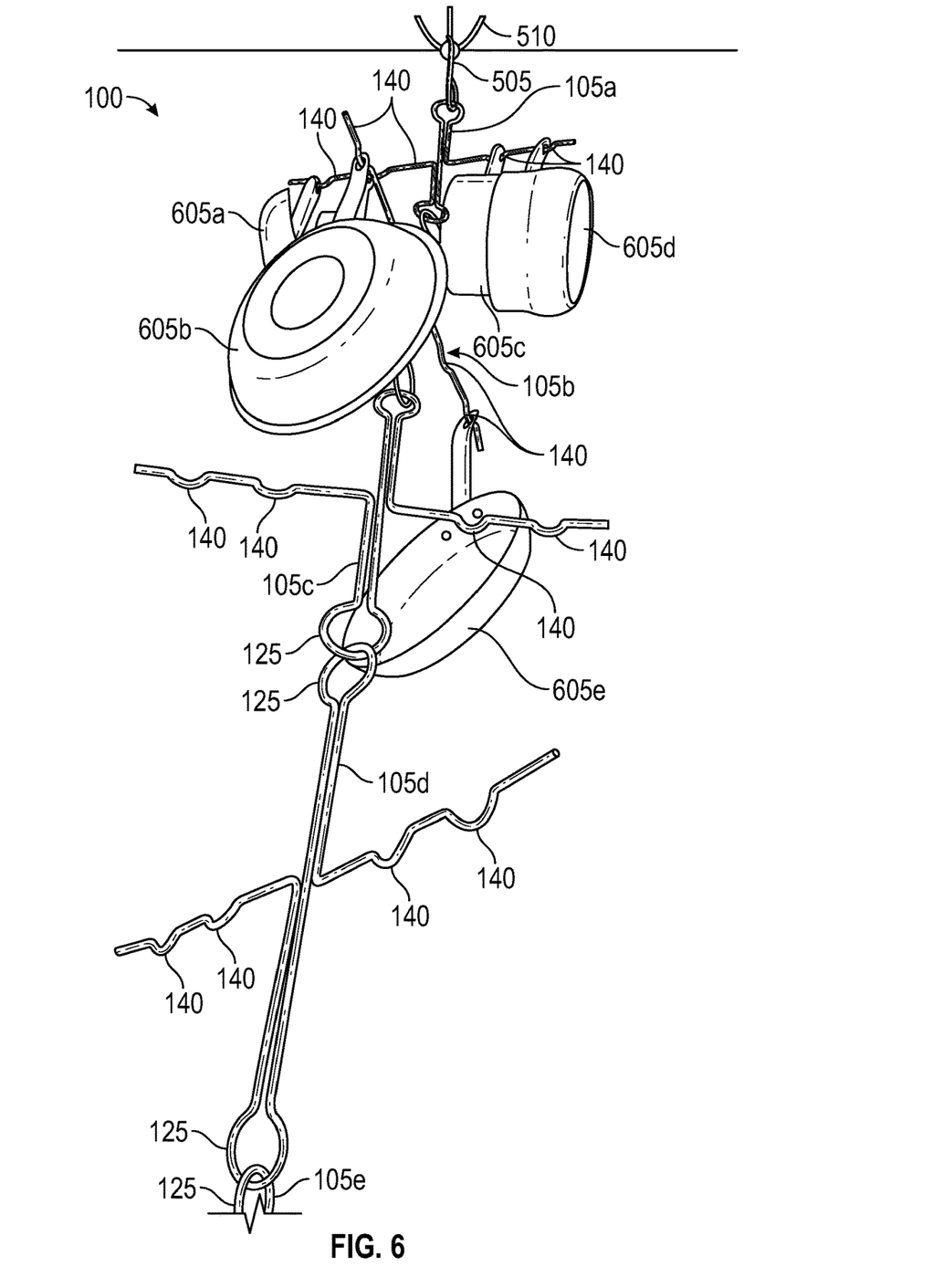
FIG. 6 depicts five interconnected storage rack sections in a vertical storage rack configuration secured to a ceiling mount wherein the uppermost two storage rack sections support cooking pots and pans.

FIG. 6 depicts five interconnected storage rack sections in a vertical storage rack configuration secured to a ceiling mount wherein the uppermost two storage rack sections support cooking pots and pans. In FIG. 6, the interconnected storage rack sections 105a, 105b, 105c, 105d, and 105e comprise at least the storage rack 105 features described with reference to FIG. 1. In the depicted implementation the storage rack section 105a is supported by the fastener 505 connected to the ceiling 510. In the depicted implementation the storage rack section 105a supports hanging items 605a, 605c, and 605d, and the storage rack section 105b supports hanging items 605b and 605e. In the depicted implementation, the hanging items 605a, 605b, 605c, 605d, and 605e are pots. The hanging items 605 may be any physical item usefully supported for storage by any of the depicted storage rack sections 105a, 105b, 105c, 105d, and 105e. In an illustrative example the bottom-most storage rack section 105e may be secured to a floor using a fastener such as, for example, a length of rope, string, chain, or a suction cup.

Figure 7:
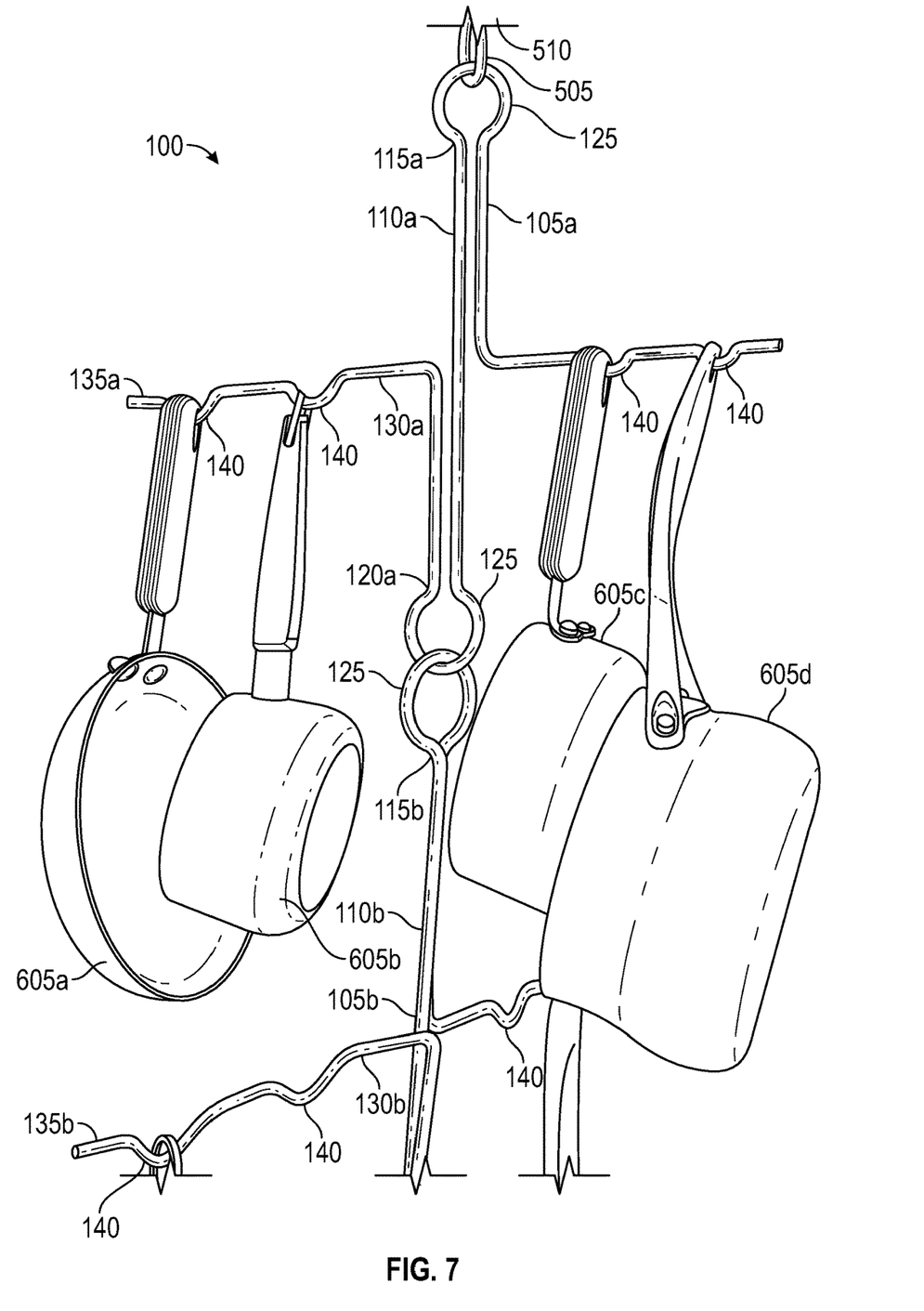
FIG. 7 depicts two interconnected storage rack sections in a vertical storage rack configuration secured to a ceiling mount wherein the uppermost storage rack section supports a heavy load comprising multiple large cooking pots and pans.

FIG. 7 depicts two interconnected storage rack sections in a vertical storage rack configuration secured to a ceiling mount wherein the uppermost storage rack section supports a heavy load comprising multiple large cooking pots and pans. In FIG. 7, the interconnected storage rack sections 105a and 105b comprise at least the storage rack 105 features described with reference to FIG. 1. In the depicted implementation the storage rack section 105a is supported by the fastener 505 connected to the ceiling 510 and the storage rack section 105b is supported by the storage rack section 105a. In the depicted implementation the bottom-most storage rack section 105*b* may be secured to a floor as described with reference to FIG. 6. In the depicted implementation the storage rack section 105*b* may remain unsecured. In the depicted implementation the storage rack section 105*b* may be secured to a third storage rack section not shown in FIG. 7. In the depicted implementation the storage rack section 105*a* supports the hanging items 605*a*, 605*b*, 605*c*, and 605*d*. In the depicted implementation, the hanging items 605*a*, 605*b*, 605*c*, and 605*d* are heavy pots.

In an aspect, an exemplary apparatus (100) may comprise: at least one storage rack structure section (105) comprising: a rack support (110) comprising a first elongated member having a hanging end (115) and a connecting end (120) distal from the hanging end (115), wherein the hanging end (115) and the connecting end (120) are each configured with a respective connector aperture (125); and an accessory support (130) comprising a second elongated member disposed substantially perpendicular to the rack support (110), wherein the accessory support (130) is substantially bisected by the rack support (110), and wherein the rack support (110) and the accessory support (130) are formed from a single strand of a thread-like structure (135).

The thread-like structure (135) may further comprise wire.

The thread-like structure (135) may further comprise cable.

The thread-like structure (135) may further comprise plastic.

The thread-like structure (135) may further comprise steel.

The steel may further comprise mild steel.

The thread-like structure (135) may have a thickness in a range of 1/16 to 3/8 inch.

At least one connector aperture (125) may further comprise at least one connector aperture twist (405).

At least one connector aperture (125) may further comprise a connector aperture perimeter (415) comprising at least one connector aperture twist (405).

At least one connector aperture (125) may further comprise at least one eye-loop (155).

At least one eye-loop (155) may further comprise a closed eye-loop.

At least one eye-loop (155) may further comprise an open loop.

The accessory support (130) may further comprise at least one notch (140) configured to support a hanging item (605) such as a pot.

The accessory support (130) may further comprise a plurality of notches (140) configured at each side of the rack support (110) to support a plurality of hanging items (605) such as pots from each side of the rack support (110).

At least one connector aperture (125) may further comprise a connector aperture twist (405) configured in a connector aperture perimeter (415) of the at least one connector aperture (125) to permit a plurality of interconnected connector apertures (125) to swivel about an axis substantially parallel with at least one rack support (410).

The apparatus (100) may further comprise a plurality of interconnected storage rack structure sections (105).

The plurality of interconnected storage rack structure sections (105) may be interconnected based on linking at least one connector aperture (125) disposed at a connecting end (120) of at least a first rack support (110) with at least one connector aperture (125) disposed at a hanging end (115) of at least a second rack support (110).

The single strand of the thread-like structure (135) may extend from a beginning accessory support end (145) disposed at a first side of the rack support (110) to an ending accessory support end (150) disposed at a second side of the rack support (110).

At least one hanging end (115) may be configured with a fastener (505) securing at least one rack support (110) to a ceiling (510).

At least one connecting end (120) may be configured with a fastener (505) securing at least one rack support (110) to a floor.

An exemplary apparatus (100) may comprise: at least one storage rack structure section (105) comprising: a rack support (110) comprising a first elongated member having a hanging end (115) and a connecting end (120) distal from the hanging end (115), wherein the hanging end (115) and the connecting end (120) are each configured with a respective connector aperture (125), and wherein the rack support (110) further comprises: a rack support (110) central section (122) extending from the rack support (110) hanging end (115) to the rack support (110) connecting end (120); a first rack support (110) side section (124) proximal to a beginning accessory support end (145) disposed at a first side of the rack support (110), wherein the rack support (110) hanging end (115) connector aperture (125) further comprises a hanging end channel (126) defined by the rack support (110) central section (122) and the first rack support (110) side section (124), said hanging end channel (126) open toward the rack support (110) connecting end (120); a second rack support (110) side section (128) proximal to an ending accessory support end (150) disposed at a second side of the rack support (110), wherein the rack support (110) connecting end (120) connector aperture (125) further comprises a connecting end channel (132) defined by the rack support (110) central section (122) and the second rack support (110) side section (128), said connecting end channel (132) open toward the rack support (110) hanging end (115); and an accessory support (130) comprising a second elongated member disposed substantially perpendicular to the rack support (110) central section (122), wherein the accessory support (130) is substantially bisected by the rack support (110) central section (122), and wherein the at least one storage rack structure section (105) comprising the rack support (110) and the accessory support (130) is formed from a single strand of a thread structure (135).

The first rack support (110) side section (124) may have a length substantially half a length of the rack support (110) central section (122), the rack support (110) central section (122) having a length defined by a distance between the rack support (110) hanging end (115) and the rack support (110) connecting end (120), said first rack support (110) side section (124) disposed substantially parallel with the rack support (110) central section (122).

The second rack support (110) side section (128) may have a length substantially half a length of the rack support (110) central section (122), the rack support (110) central section (122) having a length defined by a distance between the rack support (110) hanging end (115) and the rack support (110) connecting end (120), said second rack support (110) side section (128) disposed substantially parallel with the rack support (110) central section (122).

Although various features have been described with reference to the Figures, other features are possible. For example, an implementation in accordance with the present disclosure may comprise a vertical hanging pot rack designed to accommodate hanging pots. In an illustrative example, a pot rack design in accordance with the teaching of the present disclosure may be designed to accommodate hanging pots vertically for kitchens with limited space. An exemplary pot rack may hang vertically from a ceiling to the floor with a length depending on the number of interconnected storage rack sections. The number of interconnected storage rack sections may be determined based on the number of pots needing storage. An exemplary storage rack design may be modular, with each separate identical unit capable of supporting multiple pots. In an implementation, an exemplary storage rack section may be configured to support four pots.

In an implementation in accordance with the teaching of the present disclosure, multiple storage rack sections may be linked vertically to store pots and other items using less floor space than other designs. In an illustrative example, an implementation in accordance with the teaching of the present disclosure may provide economical vertical item storage in an easily accessible and expandable storage rack using ordinarily wasted space such as, for example, a corner of a room.

Various implementations in accordance with the teaching of the present disclosure may solve significant problems for small kitchens with limited cabinet and floor space. Some exemplary implementations may be designed to suspend sixteen to twenty-eight pots from a ceiling while occupying no more than 1.5 (one-and-a-half) square feet of floor space. In an illustrative example the storage rack length depends on the number of individual rack sections used, which is determined by the number of pots or other items needing to be hung. In some scenarios an exemplary pot rack implementation may be installed at or near a room corner, which may be wasted space reclaimed for a useful purpose by an implementation in accordance with the present disclosure. Various exemplary pot rack implementations may be useful to a wide range of users such as a commercial chef or home cook, In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale, and features of one implementation may be employed with other implementations as the skilled artisan would recognize, even if not explicitly stated herein. Descriptions of well-known components and processing techniques may be omitted so as to not unnecessarily obscure the implementation features.

In various implementations, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. Likewise, use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, all descriptions where "comprising" is used may have as alternatives "consisting essentially of," or "consisting of" In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of implementation apparatus are known in the art. One or more implementation part may be formed by machining, welding, bending, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" may refer to any form of interaction between two or more entities, including mechanical, electrical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

The respective reference numbers and descriptions of the elements depicted by the Drawings are summarized as follows.
100 apparatus
105 storage rack structure section
110 rack support
115 hanging end
120 connecting end
122 rack support central section
124 first rack support side section
125 connector aperture
126 hanging end channel
128 second rack support side section
130 accessory support
132 connecting end channel
135 single strand of a thread-like structure
140 notch
145 beginning accessory support end
150 ending accessory support end
155 eye-loop
405 connector aperture twist
410 axis substantially parallel with at least one rack support
415 connector aperture perimeter
505 fastener
510 ceiling
605 hanging item A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. An apparatus (100) comprising:
at least one storage rack structure section (105) comprising:
a rack support (110) comprising a first elongated member having a hanging end (115) and a connecting end (120) distal from the hanging end (115), wherein the hanging end (115) and the connecting end (120) are each configured with a respective connector aperture (125), and wherein the rack support (110) further comprises:
a rack support central section (122) extending from the rack support (110) hanging end (115) to the rack support (110) connecting end (120);
a first rack support side section (124) proximal to a beginning accessory support end (145) disposed at a first side of the rack support (110), wherein the rack support (110) hanging end (115) connector aperture (125) further comprises a hanging end channel (126) defined by the rack support central section (122) and the first rack support side section (124), said hanging end channel (126) open toward the rack support (110) connecting end (120);
a second rack support side section (128) proximal to an ending accessory support end (150) disposed at a second side of the rack support (110), wherein the rack support (110) connecting end (120) connector aperture (125) further comprises a connecting end channel (132) defined by the rack support central section (122) and the second rack support side section (128), said connecting end channel (132) open toward the rack support (110) hanging end (115); and an accessory support (130) comprising a second elongated member disposed substantially perpendicular to the rack support central section (122), wherein the accessory support (130) is substantially bisected by the rack support central section (122), and wherein the at least one storage rack structure section (105) comprising the rack support (110) and the accessory support (130) is formed from a single strand of a thread structure (135).

2. The apparatus (100) of claim 1, wherein the thread structure (135) further comprises wire.

3. The apparatus (100) of claim 1, wherein the thread structure (135) further comprises cable.

4. The apparatus (100) of claim 1, wherein the thread structure (135) further comprises plastic.

5. The apparatus (100) of claim 1, wherein the thread structure (135) further comprises steel.

6. The apparatus (100) of claim 5, wherein the steel further comprises mild steel.

7. The apparatus (100) of claim 1, wherein the thread structure (135) has a thickness in a range of 1/16 to 3/8 inch.

8. The apparatus (100) of claim 1, wherein at least one connector aperture (125) further comprises at least one connector aperture twist (405).

9. The apparatus (100) of claim 1, wherein at least one connector aperture (125) further comprises a connector aperture perimeter (415) comprising at least one connector aperture twist (405).

10. The apparatus (100) of claim 1, wherein at least one connector aperture (125) further comprises at least one eye-loop (155).

11. The apparatus (100) of claim 10, wherein the at least one eye-loop (155) further comprises a closed eye-loop.

12. The apparatus (100) of claim 1, wherein the first rack support side section (124) has a length substantially half a length of the rack support central section (122), the rack support central section (122) having a length defined by a distance between the rack support (110) hanging end (115) and the rack support (110) connecting end (120), said first rack support side section (124) disposed substantially parallel with the rack support central section (122).

13. The apparatus (100) of claim 1, wherein the accessory support (130) further comprises at least one notch (140) configured to support a hanging item (605) such as a pot.

14. The apparatus (100) of claim 1, wherein the accessory support (130) further comprises a plurality of notches (140) configured at each side of the rack support (110) to support a plurality of hanging items (605) such as pots from each side of the rack support (110).

15. The apparatus (100) of claim 1, wherein at least one connector aperture (125) further comprises a connector aperture twist (405) configured in a connector aperture perimeter (415) of the at least one connector aperture (125) to permit a plurality of interconnected connector apertures (125) to swivel about an axis substantially parallel with at least one rack support (410).

16. The apparatus (100) of claim 1, wherein the apparatus (100) further comprises a plurality of interconnected storage rack structure sections (105).

17. The apparatus (100) of claim 16, wherein the plurality of interconnected storage rack structure sections (105) are interconnected based on linking at least one connector aperture (125) disposed at a connecting end (120) of at least a first storage rack structure section (105) rack support (110) with at least one connector aperture (125) disposed at a hanging end (115) of at least a second storage rack structure section (105) rack support (110).

18. The apparatus (100) of claim 1, wherein the single strand of the thread structure (135) extends continuously from the beginning accessory support end (145) disposed at a first side of the rack support (110) to the ending accessory support end (150) disposed at a second side of the rack support (110).

19. The apparatus (100) of claim 1, wherein at least one hanging end (115) is configured with a fastener (505) securing at least one rack support (110) to a ceiling (510).

20. The apparatus (100) of claim 1, wherein the second rack support side section (128) has a length substantially half a length of the rack support central section (122), the rack support central section (122) having a length defined by a distance between the rack support (110) hanging end (115) and the rack support (110) connecting end (120), said second rack support side section (128) disposed substantially parallel with the rack support central section (122).

* * * * *